(12) United States Patent
Weidmann (10) Patent No.: US 10,748,163 B1
(45) Date of Patent: Aug. 18, 2020

(54) USER INTERFACE GENERATION BASED ON PURCHASE READINESS

(71) Applicant: Target Brands, Inc., Minneapolis, MN (US)

(72) Inventor: Eric John Cushing Weidmann, Columbia Heights, MN (US)

(73) Assignee: Target Brands, Inc., Minneapolis, MN (US)

( * ) Notice: Subject to any disclaimer, the term of this patent is extended or adjusted under 35 U.S.C. 154(b) by 332 days.

(21) Appl. No.: 15/145,387

(22) Filed: May 3, 2016

(51) Int. Cl.
*G06Q 30/02* (2012.01)
*G06Q 30/06* (2012.01)
*G06F 16/248* (2019.01)
*G06F 16/9535* (2019.01)
*G06F 16/2457* (2019.01)

(52) U.S. Cl.
CPC ....... *G06Q 30/0201* (2013.01); *G06F 16/248* (2019.01); *G06F 16/24575* (2019.01); *G06F 16/9535* (2019.01); *G06Q 30/0625* (2013.01); *G06Q 30/0643* (2013.01)

(58) Field of Classification Search
None
See application file for complete search history.

(56) References Cited

U.S. PATENT DOCUMENTS

| 9,329,759 | B1 * | 5/2016 | Hill | G06F 3/04842 |
| 2002/0019774 | A1 | 2/2002 | Kanter | |
| 2002/0057299 | A1 | 5/2002 | Oren et al. | |
| 2005/0040230 | A1 * | 2/2005 | Swartz | G06K 17/00 235/383 |
| 2006/0069617 | A1 | 3/2006 | Milener et al. | |
| 2008/0097842 | A1 | 4/2008 | Tirumala et al. | |
| 2010/0250714 | A1 | 9/2010 | Wehmann et al. | |
| 2013/0262182 | A1 * | 10/2013 | Kodra | G06Q 30/0202 705/7.31 |
| 2014/0095285 | A1 * | 4/2014 | Wadell | G06Q 30/00 705/14.25 |
| 2015/0278210 | A1 * | 10/2015 | Novotny | G06F 16/24578 707/733 |
| 2015/0294357 | A1 * | 10/2015 | Anjum | G06Q 30/0256 705/14.54 |

OTHER PUBLICATIONS

T. H. Kim, V. Gligor and A. Perrig, "A Picture is Worth a Thousand Words: Improving Usability and Robustness of Online Recommendation Systems," 2011 Proceedings of 20th International Conference on Computer Communications and Networks (ICCCN), Maui, HI, 2011, pp. 1-6, doi: 10.1109/ICCCN.2011.6005882. (Year: 2011).*

* cited by examiner

*Primary Examiner* — Matthew S Gart
*Assistant Examiner* — Camille M Galloway
(74) *Attorney, Agent, or Firm* — Westman, Champlin & Koehler, P.A.; Theodore M. Magee (57) ABSTRACT

A computer-implemented method includes receiving information describing an interaction with a computing system and using the information to identify confidence levels for a plurality of purchase readiness states. Based on the confidence levels for the purchase readiness states, emphasis levels are selected for a plurality of elements on a user interface the user interface is generated based on the selected emphasis levels.

17 Claims, 10 Drawing Sheets

USER INTERFACE GENERATION BASED ON PURCHASE READINESS

BACKGROUND

On-line retail systems provide search boxes and navigational tools to allow on-line shoppers to quickly locate pages containing items they want to purchase. These systems assume that the shopper has a very specific product in mind and therefore purposely limit the content returned to the shopper so that it is focused as much as possible on the system's best guess of what the shopper wants to buy.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving information describing an interaction with a computing system and using the information to identify confidence levels for a plurality of purchase readiness states. Based on the confidence levels for the purchase readiness states, emphasis levels are selected for a plurality of elements on a user interface the user interface is generated based on the selected emphasis levels.

In a further embodiment, a computer-implemented method includes receiving information describing an interaction with a computing system and using the information to identify confidence levels for a plurality of purchase readiness states. Based on the confidence levels for the purchase readiness states, a key performance indicator is selected. A user interface is generated and a value for the key performance indicator based on an interaction with the user interface is received. The confidence level for at least one purchase readiness state is modified based on the value of the key performance indicator.

A system includes a memory containing user interface elements and a processor. The processor predicts a confidence level of a plurality of purchase readiness states and selects and organizes user interface elements to construct a user interface based on the predicted confidence levels. The processor then transmits the user interface to a client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In current on-line retailing systems, it is assumed that the consumer is attempting to find a particular product and to purchase that product as quickly as possible. As a result, the webpages that serve products are designed to help the consumer find the particular product they have in mind as quickly as possible and to complete the purchase of that product as quickly as possible. The present inventors, however, have discovered that on-line consumers actually visit websites in different purchase readiness states. In fact, the present inventors have discovered that there is a spectrum 100 of FIG. 1 of purchase readiness states that consumers can be in when they visit an on-line website. Purchase readiness spectrum 100 includes a state 102 in which the consumer has no intension of making a purchase, does not know what type of product is needed, but has a vague idea of a general need they have such as wanting to refresh their living room, for example. Purchase readiness spectrum 100 also includes an intermediate purchase readiness state 106 in which the consumer has an idea of a product type, such as a floor lamp, that they are looking to purchase but the consumer is not sure of which particular product they want. For instance the consumer does not know which floor lamp they want to buy. At the other end of purchase readiness spectrum 100 is state 104 in which the consumer has a specific product in mind, knows how much they are willing to spend on the product and is ready to purchase the product as quickly as possible.

Figure 1:
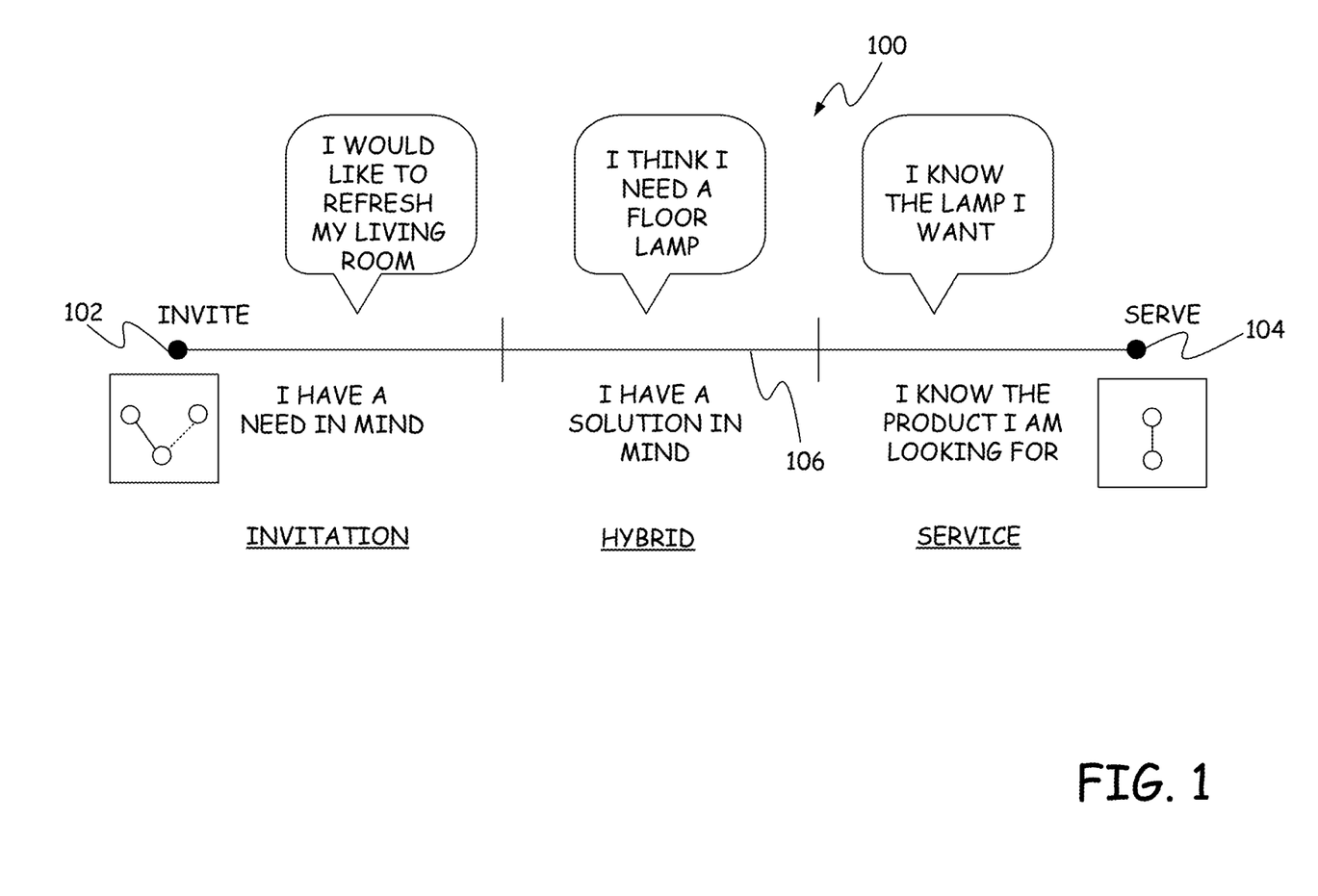
FIG. 1 is a graph showing a spectrum of purchase readiness states.

The present inventors have discovered that attempting to display particular products to on-line consumers who are in purchase readiness state 102 is ineffective because the consumers have no idea of what type of products they actually want. Current retail websites do not effectively help on-line consumers who are in purchase readiness state 102.

The embodiments described below provide a dynamic retail webpage delivery system that modifies the emphasis of various webpage elements based on where the consumer resides along the purchase readiness spectrum 100. For example, if the consumer is close to purchase readiness state 102, webpage elements that provide general education are given more emphasis than webpage elements that describe particular products. For example, a video showing the latest interior design trends can be displayed to a user who has a vague idea that they need to update their living room. When a consumer is in a purchase readiness state 106, the page elements that provide categories of products and that allow the consumer to browse through a number of products in a particular category are provided with more emphasis on the webpage. Finally, when a consumer is in purchase readiness state 104, the elements that show individual products are given more emphasis as are elements that allow the consumer to add products to their cart and to proceed to checkout. By properly identifying the purchase readiness state of the on-line consumer, the computing system of the various embodiments is more efficient and effective at conveying relevant information to a consumer.

Figure 2:
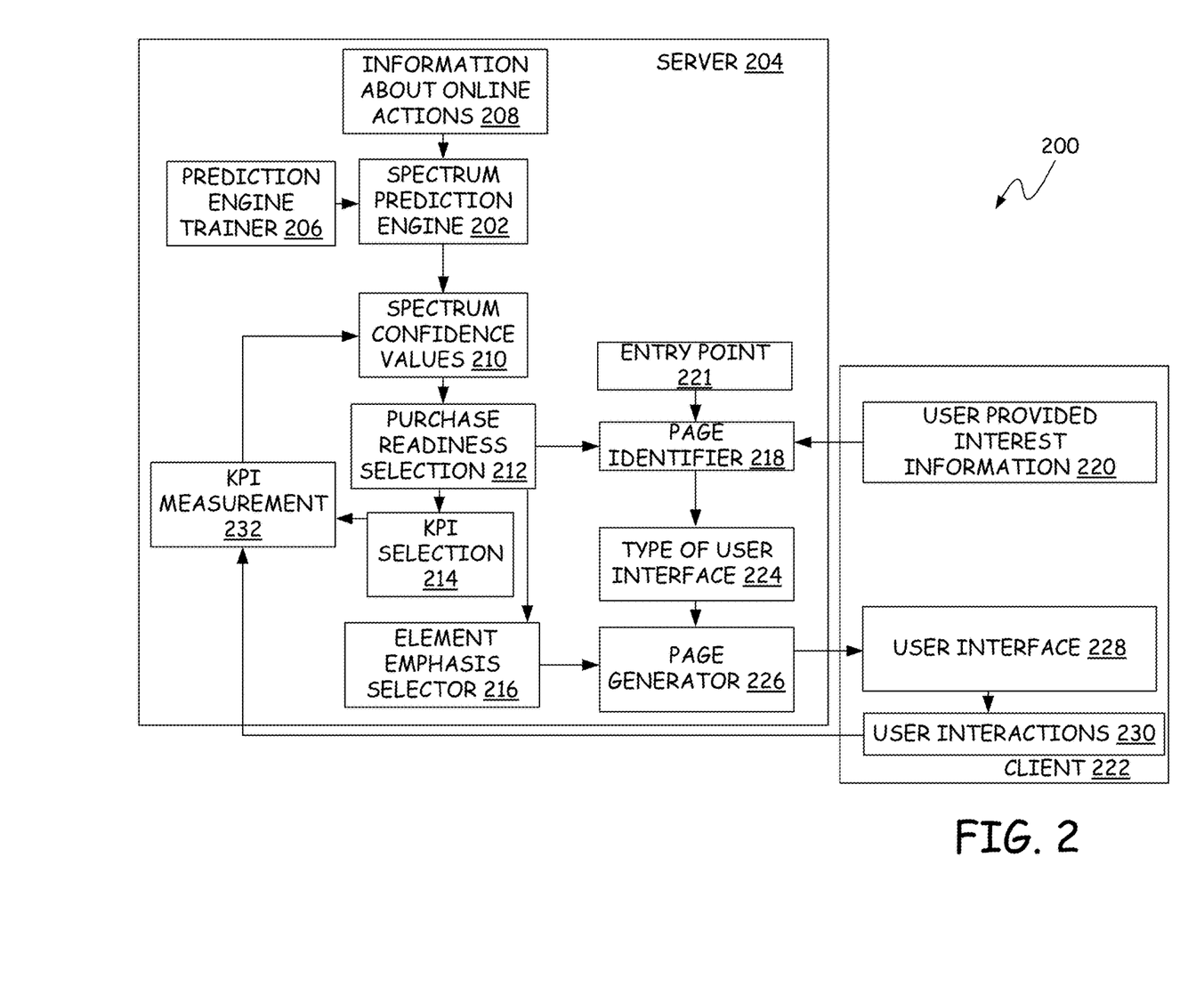
FIG. 2 is a block diagram of a system used in accordance with some embodiments.
Figure 3:
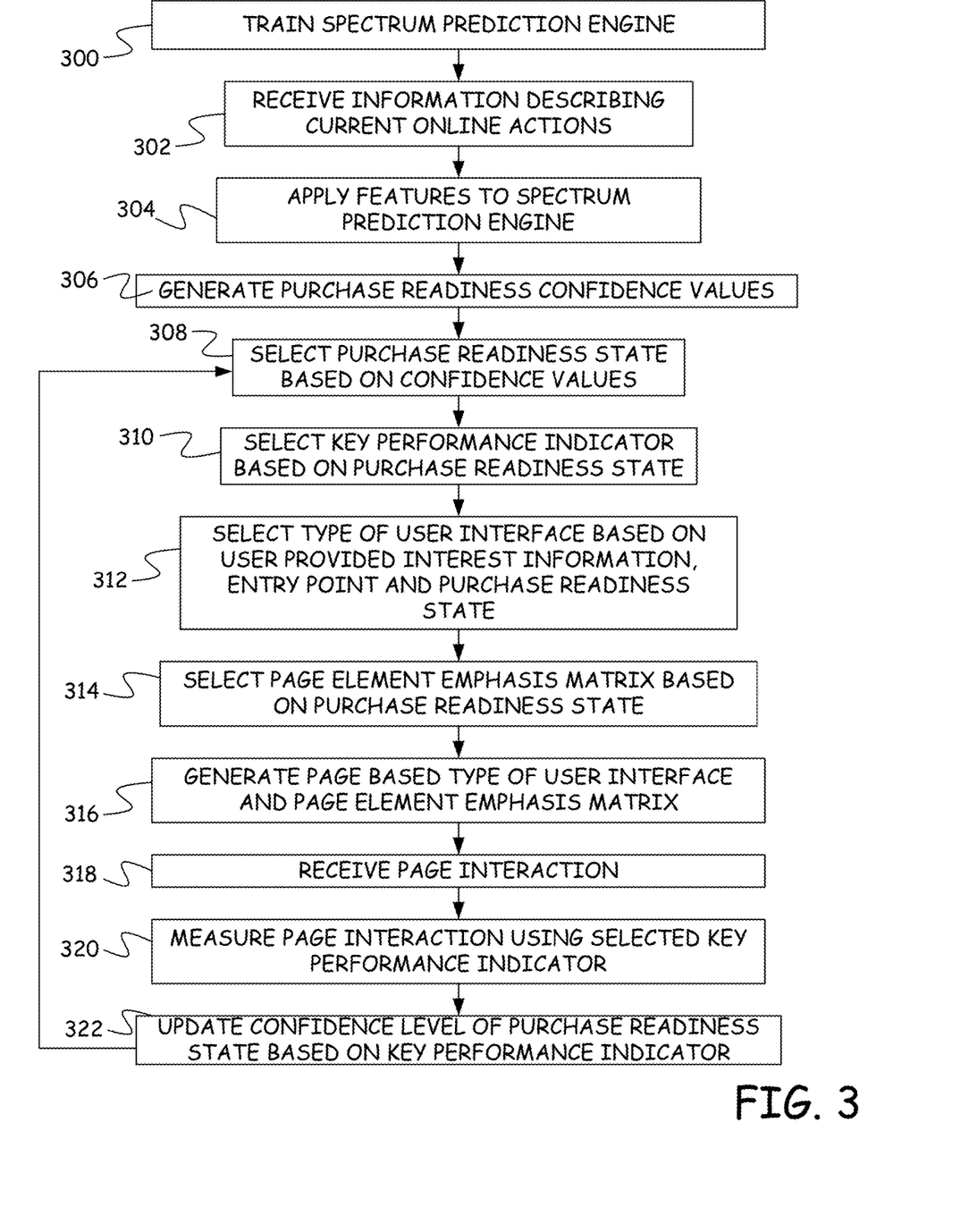
FIG. 3 is a flow diagram of a method of generating a user interface in accordance with one embodiment.

FIG. 2 provides a block diagram of a system 200 and FIG. 3 provides a flow diagram of a method in accordance with the various embodiments that identify a purchase readiness state and that generate a user interface based on the purchase readiness state of the consumer.

At step 300 of FIG. 3, a prediction engine trainer 206 on a server 204, trains a spectrum prediction engine 202. Spectrum prediction engine 202 can be trained based on information describing on-line actions associated with various purchase readiness states. Examples of this information include the type of device a consumer uses, the geographical location of the user when they access a website, the port or channel that the consumer is currently on such as a conventional web page, a mobile web page, or a user interface generate by an application (sometimes referred to as an App), the path that the consumer used to arrive at the current port or channel, the season, a category that the consumer has selected, and a user profile generated based on the user's recent on-line actions, for example.

At step 302, information 208 describing on-line interactions with a computing system is received. In accordance with one embodiment, this information is similar to the information used to train spectrum prediction engine 202 at step 300 and can include the type of device a consumer uses, the geographical location of the user when they access a website, the port or channel that the consumer is currently on such as a conventional web page, a mobile web page, or a user interface generate by an application (sometimes referred to as an App), the path that the consumer used to arrive at the current port or channel, the season, a category that the consumer has selected, and a user profile generated based on the user's recent on-line actions, for example.

At step 304, the received information 208 is applied to the trained spectrum prediction engine 202. Based on applied information 208, spectrum prediction engine 202 predicts confidence values 210 for each of a plurality of purchase readiness states at step 306. Each confidence value indicates a likelihood of a purchase readiness state. In accordance with one embodiment, spectrum prediction engine 202 predicts the confidence values by weighting each item of information in information 208, where different weights are used for different purchase readiness states.

In accordance with one embodiment, the plurality of purchase readiness states include readiness states such as the consumer having a general need but no idea of what type of products to purchase, the consumer have an idea of a type of product they are looking for but no idea of what particular product they wish to consume, and the consumer having a definite idea of what product they want to purchase and a desire to purchase the product as quickly as possible.

At step 308, a purchase readiness selection process 212 of server 204 selects a purchase readiness state based on the confidence values. In accordance with one embodiment, the purchase readiness state with the highest confidence value is selected at step 308. At step 310, a key performance indicator (KPI) selection process 214 selects a key performance indicator based on the selected purchase readiness state at step 310.

Figure 4:
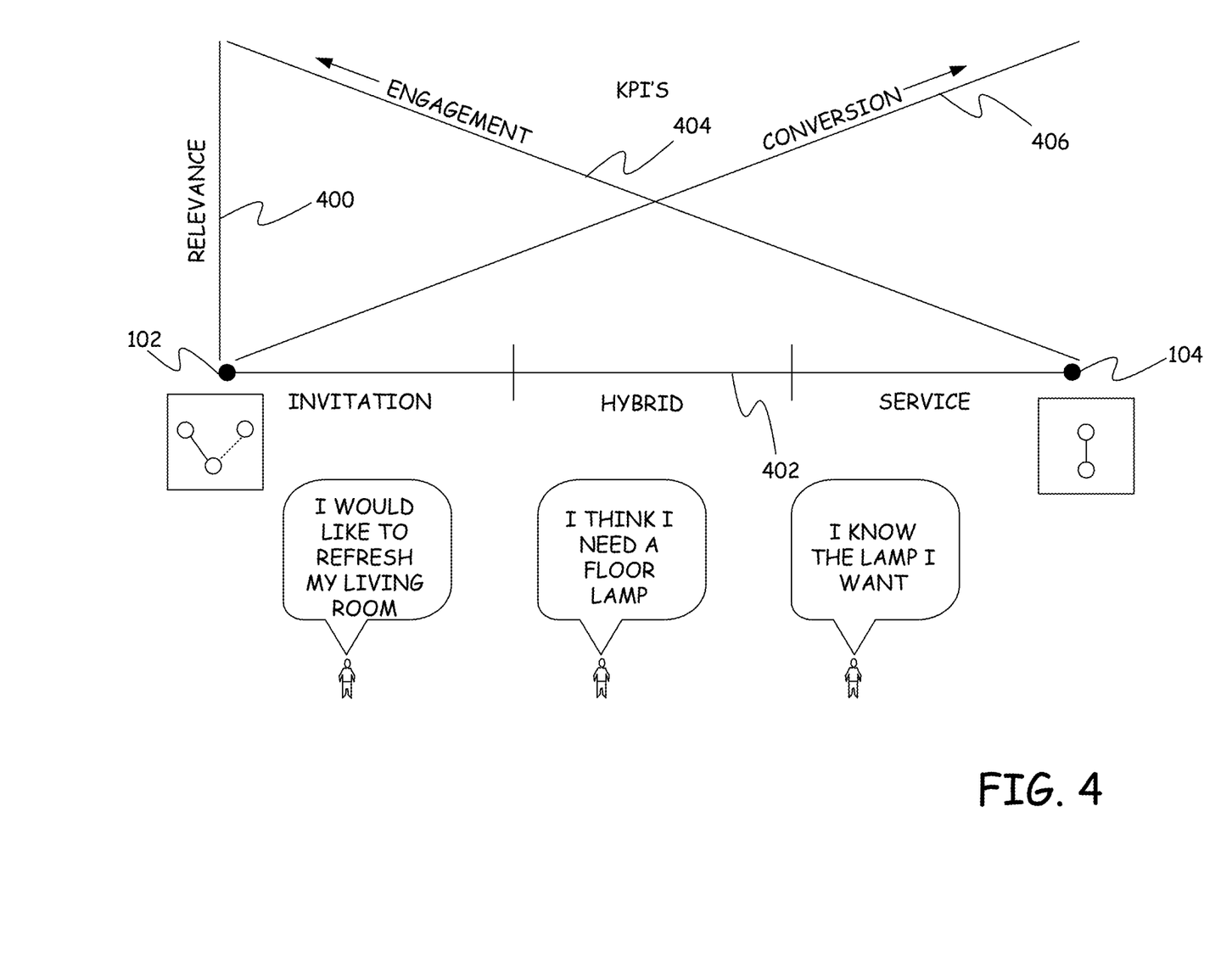
FIG. 4 is a graph showing key performance indicator relevance levels as a function of purchase readiness states.

The key performance indicator is an indicator used to measure the effectiveness of a user interface provided to a consumer. There are many such key performance indicators available. The present inventors have discovered, however, that the relevance of a key performance indicator is dependent upon the purchase readiness state of the consumer. For example, in FIG. 4, the relevance of two key performance indicators, engagement and conversion, are shown relative to the purchase readiness states of the consumer. In FIG. 4, relevance is shown on vertical axis 400 and the spectrum of purchase readiness states is shown on horizontal axis 402. The spectrum of purchase readiness states extends from purchase readiness state 102 in which the consumer is not ready to purchase a product and in fact does not have any particular product in mind to purchase readiness state 104 in which the consumer has selected a particular product and is ready to purchase that product.

Graph 404 shows the relevance of the first key performance indicator, engagement, as a function of the purchase readiness state and graph 406 shows the relevance of the second key performance indicator, conversion, as a function of purchase readiness states. Engagement is a measure of how much the consumer interacts with elements on the web page. Conversion is a measure of how close the consumer comes to completing a purchase of a product.

As shown in FIG. 4, the relevance of the engagement KPI increases the further the consumer is away from actually purchasing a product while the relevance of the conversion KPI increases the closer the consumer gets to actually purchasing a product. Thus, when a consumer is unsure of what they need, it is more important to engage them through the user interface than it is to make a sale through the user interface. Conversely, when the consumer has a strong idea of what they want to purchase, it is more important to help facilitate that purchase quickly and thus convert the consumer from shopping to buying rather than having the consumer interact with and engage with the webpage.

At step 312, a page identifier 218 selects a type of user interface 224 that is to be used to construct a user interface 228 based on user-provided interest information 220 provided by a client device 222, and an entry point 221, and the purchase readiness state identified at step 308. User-provided interest information 220 includes any information that the consumer has provided about their current interests including items such as search terms selected by the consumer, web pages visited by the consumer, and categories of products viewed by the consumer. Entry point 221 indicates how the consumer was directed to server 204 such as through an App, a mobile web site, or a traditional web site, or a search site, for example.

Figure 5:
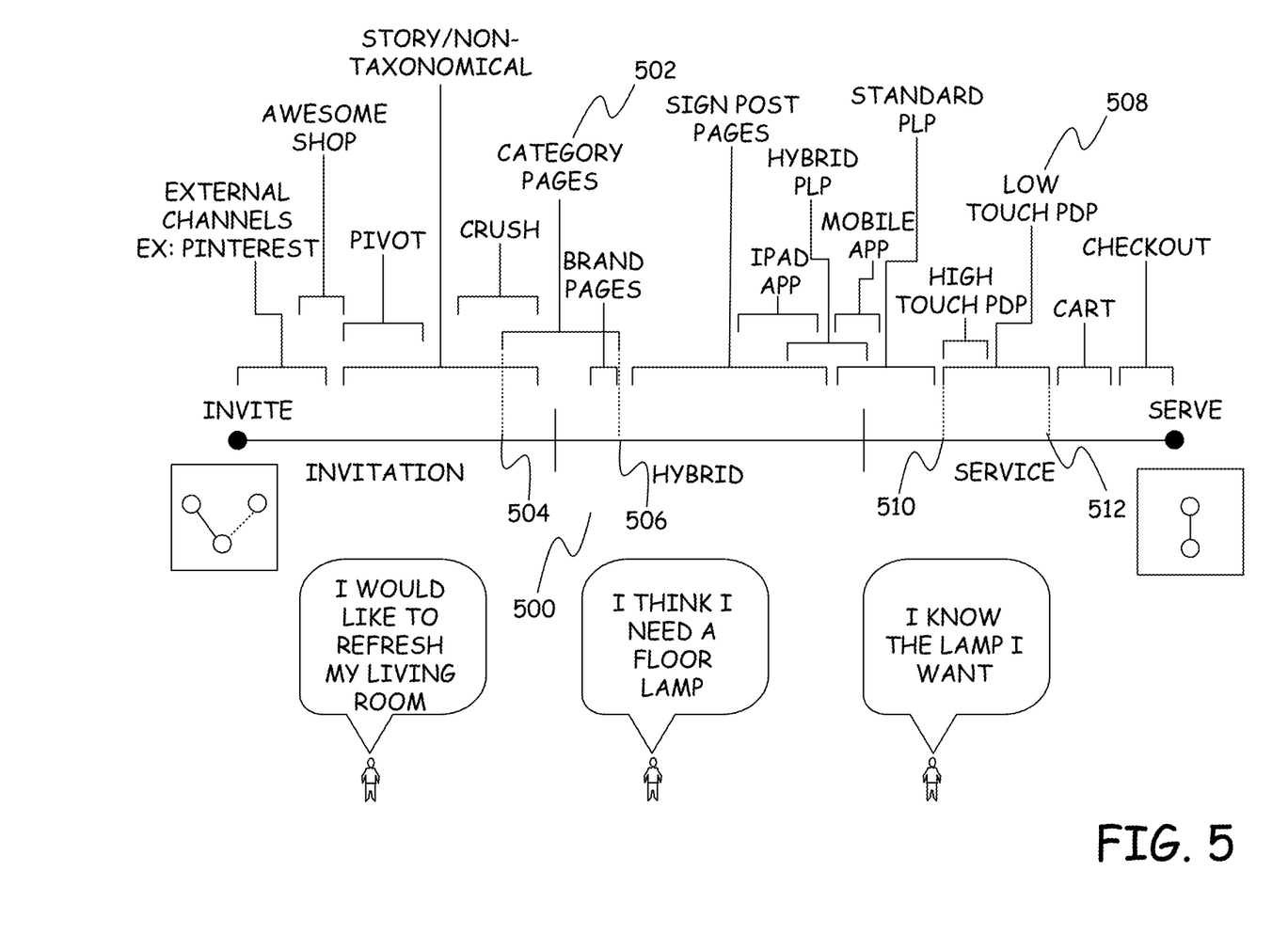
FIG. 5 is a graph showing page assignments relative to purchase readiness states.

The purchase readiness state identified in step 308 is used to select the type of user interface 224 that will be returned to the consumer because the present inventors have found that different types of user interfaces are associated with different purchase readiness states as shown in FIG. 5. In FIG. 5, the spans of purchase readiness states for various types of user interfaces are displayed relative to a purchase readiness spectrum 500. For example, category pages 502 span from a purchase readiness state 504 to a purchase readiness state 506. Similarly, a low touch product description page (PDP) 508 spans from a purchase readiness state 510 to a purchase readiness state 512. Category pages 502 are associated with purchase readiness states that are further from a consumer wishing to make a purchase than low touch PDPs 508. Category pages 502 display categories of products while low touch PDPs 508 describe the characteristics of an individual product.

In step 312, page identifier 218 may receive an indication that the user has submitted a search for a lamp, for example, and can either return a category page 502 or a low touch PDP page 508. To determine which page to return, page identifier 218 uses the purchase readiness state selected at step 308 to select between either returning a category page 502 or a low touch PDP page 508. Thus, if the consumer is between purchase readiness state 504 and 506, a category page 502 is returned and if the consumer is between purchase readiness state 510 and 512, a low touch PDP page 508 is returned.

At step 314, an element emphasis selector 216 selects an emphasis level for each of a set of page elements that can appear in user interface 228 based on the purchase readiness state selected at step 308. In accordance with one embodiment, the emphasis levels are stored as an ordered list of elements, referred to as an emphasis matrix, in which the elements are ordered based upon their emphasis levels. In general, elements that are to be provided more emphasis and therefore have a higher emphasis level are given more screen area and appear closer to the top of the page than elements that are not emphasized as much.

For a single type of user interface, different page element emphasis matrices can be used. For example, in FIG. 6, the category pages are shown to have two element emphasis matrices 602 and 604. Element emphasis matrix 602 is associated with a purchase readiness state 606 while element emphasis matrix 604 is associated with a purchase readiness state 608. In an emphasis matrix for a purchase readiness state, user interface elements that are consistent with the purchase readiness state are emphasized the most.

Figure 6:
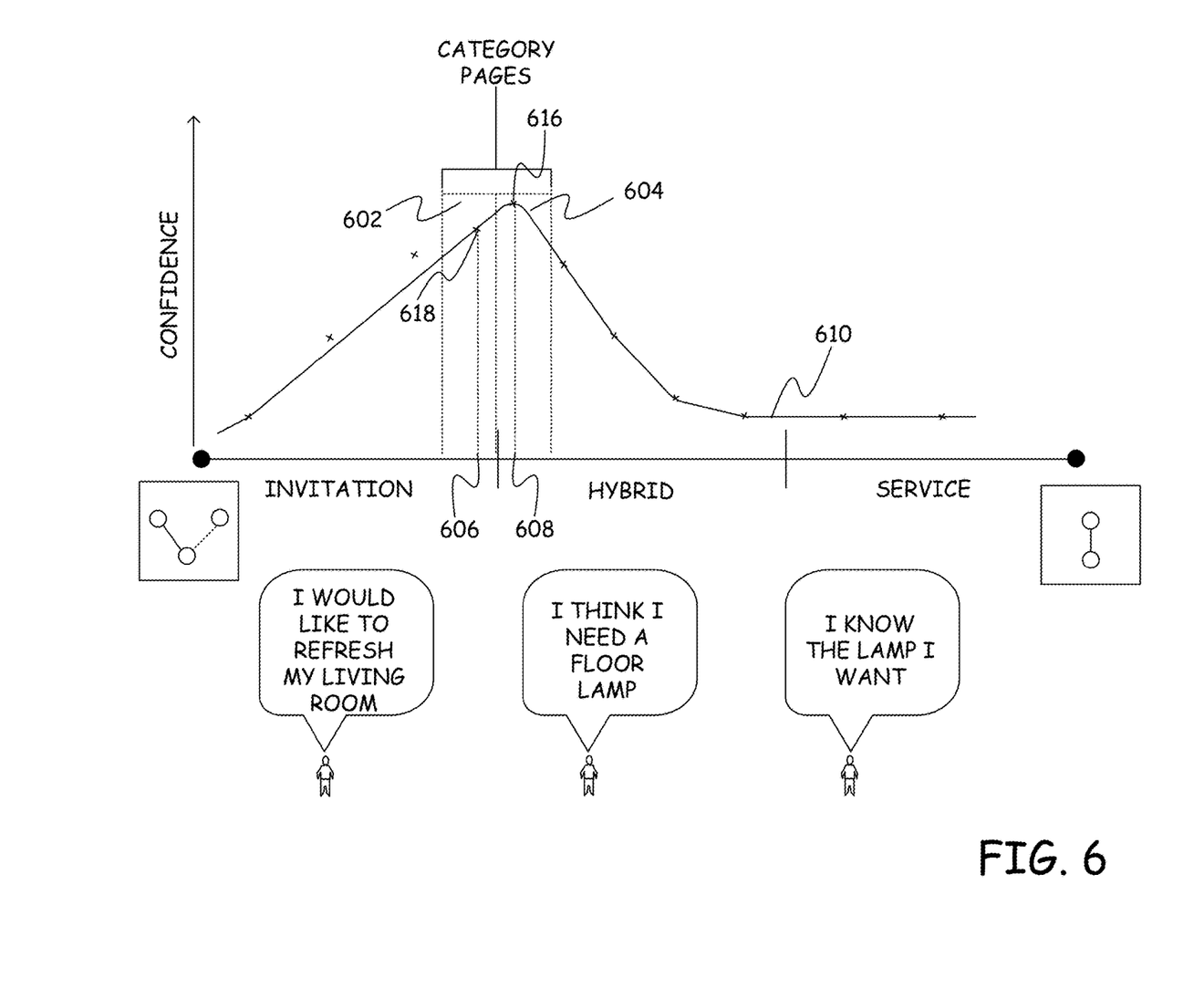
FIG. 6 is a graph of confidence levels for purchase readiness states.

In step 314, the purchase readiness state with the highest confidence value is readiness state 608 as indicated by graph 610 which provides confidence levels for various purchase readiness states. As a result, at step 314, element emphasis matrix 604 associated with purchase readiness state 608 would be selected over element emphasis matrix 602 associated with purchase readiness state 606 and the emphasis levels in emphasis matrix 602 emphasize user interface elements that are consistent with purchase readiness state 608.

Figure 7:
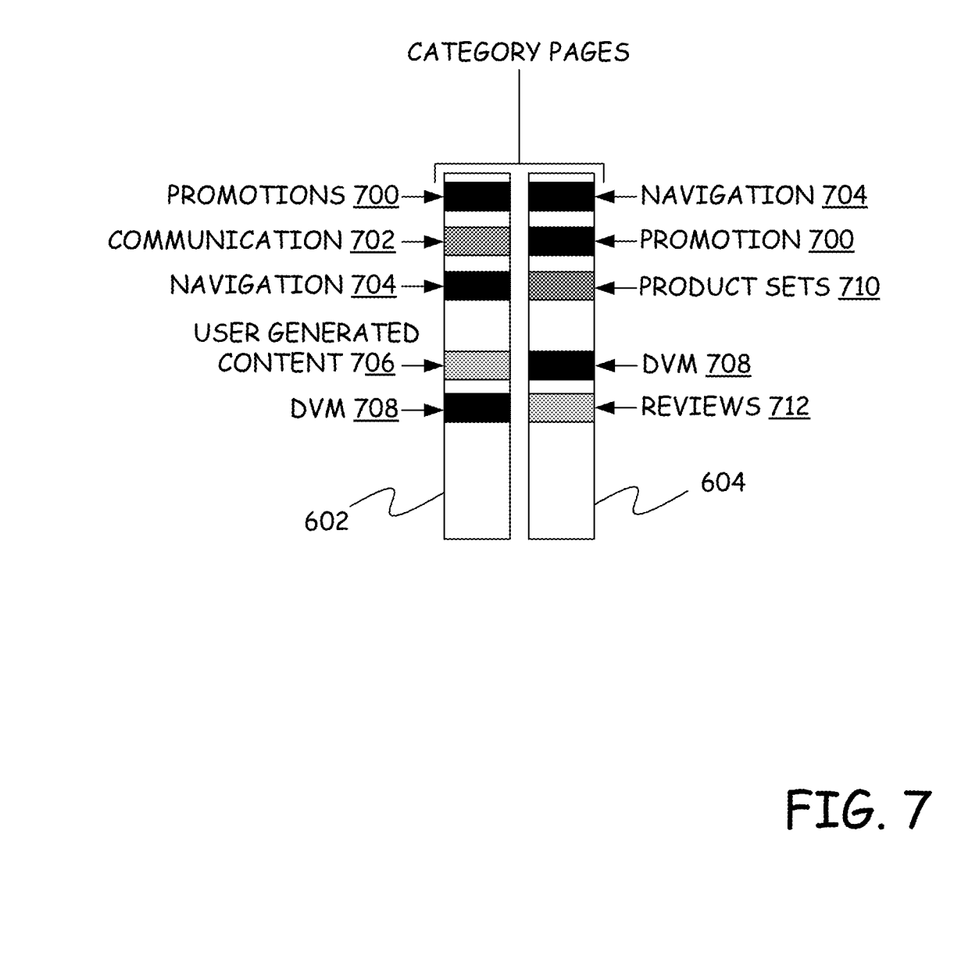
FIG. 7 is a graph of webpage element effectiveness for two different purchase readiness states.

FIG. 7 provides an example of element emphasis matrices 602 and 604. In the element emphasis matrices 602 and 604, the elements that are to be given the most emphasis are at the top of the matrix and the elements that are to be given the least emphasis are at the bottom of the matrix. In element emphasis matrix 604, promotion elements 700 are to be given the most emphasis followed by communication elements 702, navigation elements 704, user-generated content 706, and lastly DVM elements 708. In element emphasis matrix 604, navigation elements 704 are to be provided with the most emphasis followed by promotion elements 700, product sets 710, DVM elements 708, and review elements 712. Thus, depending on the purchase readiness state of the consumer, different elements within a category page will be given different emphasis.

At step 316, a page generator 226 generates a user interface 228 to be displayed on client device 222. Page generator 226 generates the page based on the type of user interface 224 selected by page identifier 218 and the emphasis matrix selected by emphasis matrix selector 216.

Figure 8:
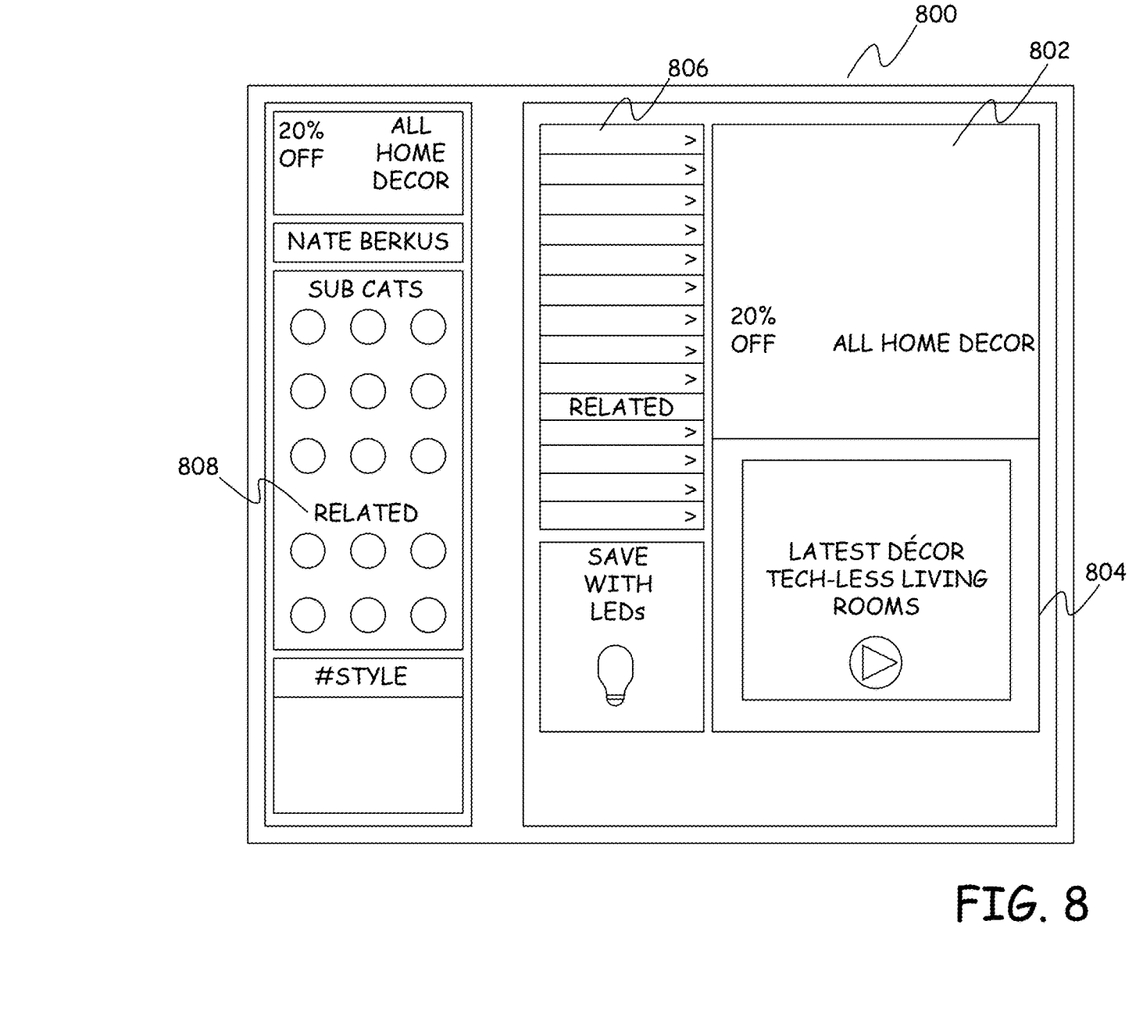
FIG. 8 is an example user interface generated for a first purchase readiness state.
Figure 9:
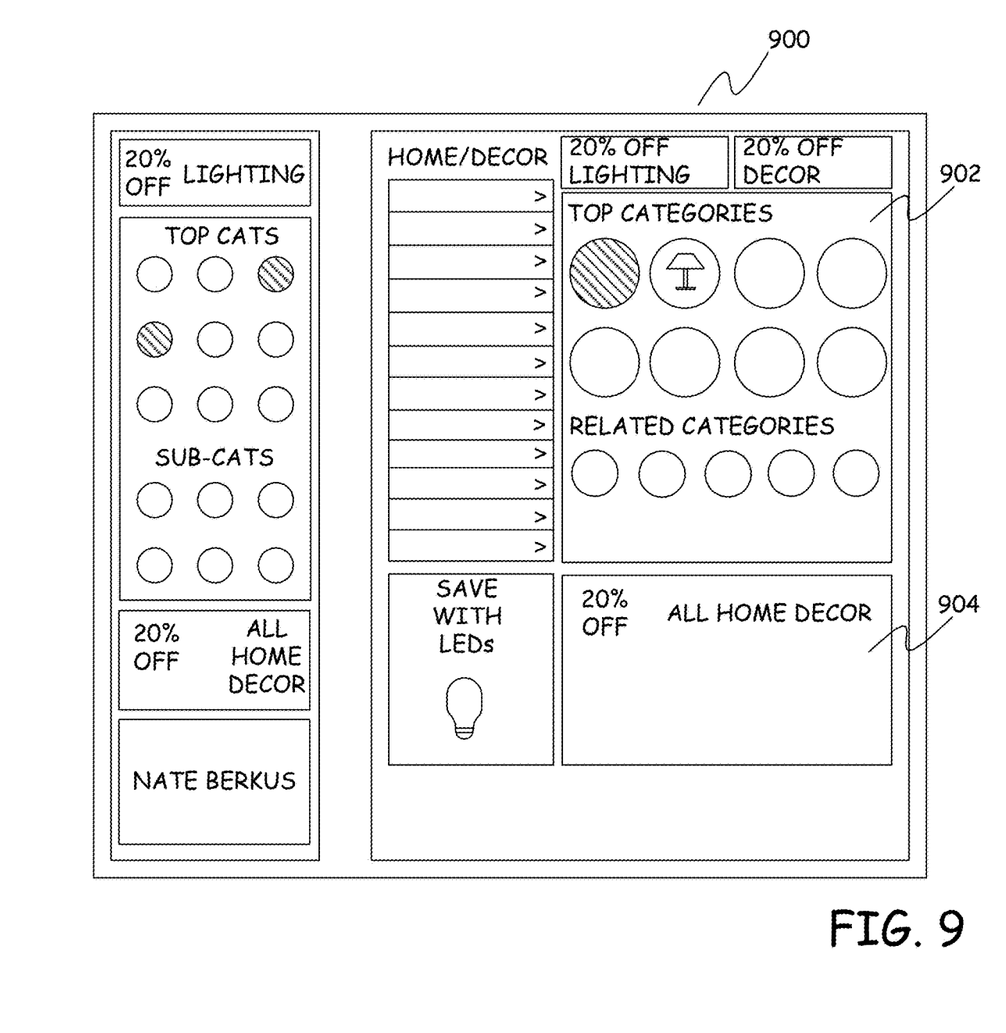
FIG. 9 is an example user interface generated for a second purchase readiness state.

FIG. 8 provides an example user interface 800 showing a category page generated using element emphasis matrix 602 while FIG. 9 provides an example user interface 900 showing a category page generated using element emphasis matrix 604. Thus, user interface 800 of FIG. 8 is generated based on consumer purchase readiness state 606 while user interface 900 of FIG. 9 is generated based on a consumer purchase readiness state 608.

In user interface 800 of FIG. 8, promotional element 802 is given primary emphasis as the largest element in user interface 800 and communication element 804 is given the second greatest emphasis being positioned below promotional element 802 and being slightly smaller than promotional element 802. Navigation elements 806 and 808 have the third greatest emphasis. Thus, the emphasis shown in user interface 800 matches the ordered emphasis of element emphasis matrix 602 of FIG. 7.

In user interface 900, which is based on element emphasis matrix 604, navigation element 902 has the greatest emphasis while promotion element 904 has the second greatest emphasis. Thus, in user interface 900, navigation is provided with more emphasis than promotion thus providing a different user interface than the user interface 800 of FIG. 8.

The difference between user interface 800 and user interface 900 is important because user interface 800 is provided to a consumer who is less likely to be ready to make an immediate purchase. As a result, a communication element 804, which provides more general information, has a higher emphasis level in user interface 800 than in user interface 900, which is provided to consumers who have a better understanding of what they are looking to buy. In particular, user interface 900 is provided to consumers who know they want a floor lamp whereas user interface 800 is provided to consumers who do not know which type of furniture they want.

At step 318, a user interacts with user interface 228 to form user interactions 230, which are received by a KPI measurement process 232 on server 204. KPI measurement process 232 uses the key performance indicator selected by KPI selection 214 at step 310 to measure user interaction 230 at step 320. For example, if the key performance indicator selected at step 310 was engagement, KPI measurement process 232 would measure the amount of engagement in user interaction 230. If the selected key performance indicator was conversion, KPI measurement process 232 would determine how close to conversion the user was in user interaction 230. The measurement of user interaction 230 acts as feedback about the confidence values assigned to each purchase readiness state.

At step 322, KPI measurement 232 updates spectrum confidence values 210 for at least the purchase readiness state selected at step 308. For example, if the user interface is unsuccessful in converting the consumer's interest into a sale, the confidence values for purchase readiness states that indicate that the consumer was ready to purchase would be reduced. Similarly, if the user interactions indicated that the consumer was not engaging with communication elements, the confidence level for purchase readiness states that indicates that the user was not ready to purchase would have their confidence levels reduced.

After the confidence levels have been updated at step 322, the process of FIG. 3 returns to step 308 and a new purchase readiness state is selected based on the new confidence values. Steps 310, 312, 314, 316, 318, 320 and 322 are then repeated. Thus, system 200 of FIG. 2 dynamically adjusts user interface 228 as it learns more about the consumer's purchase readiness state. As a result, system 200 of FIG. 2 is able to provide more relevant user interfaces that are more helpful to the consumer.

Figure 10:
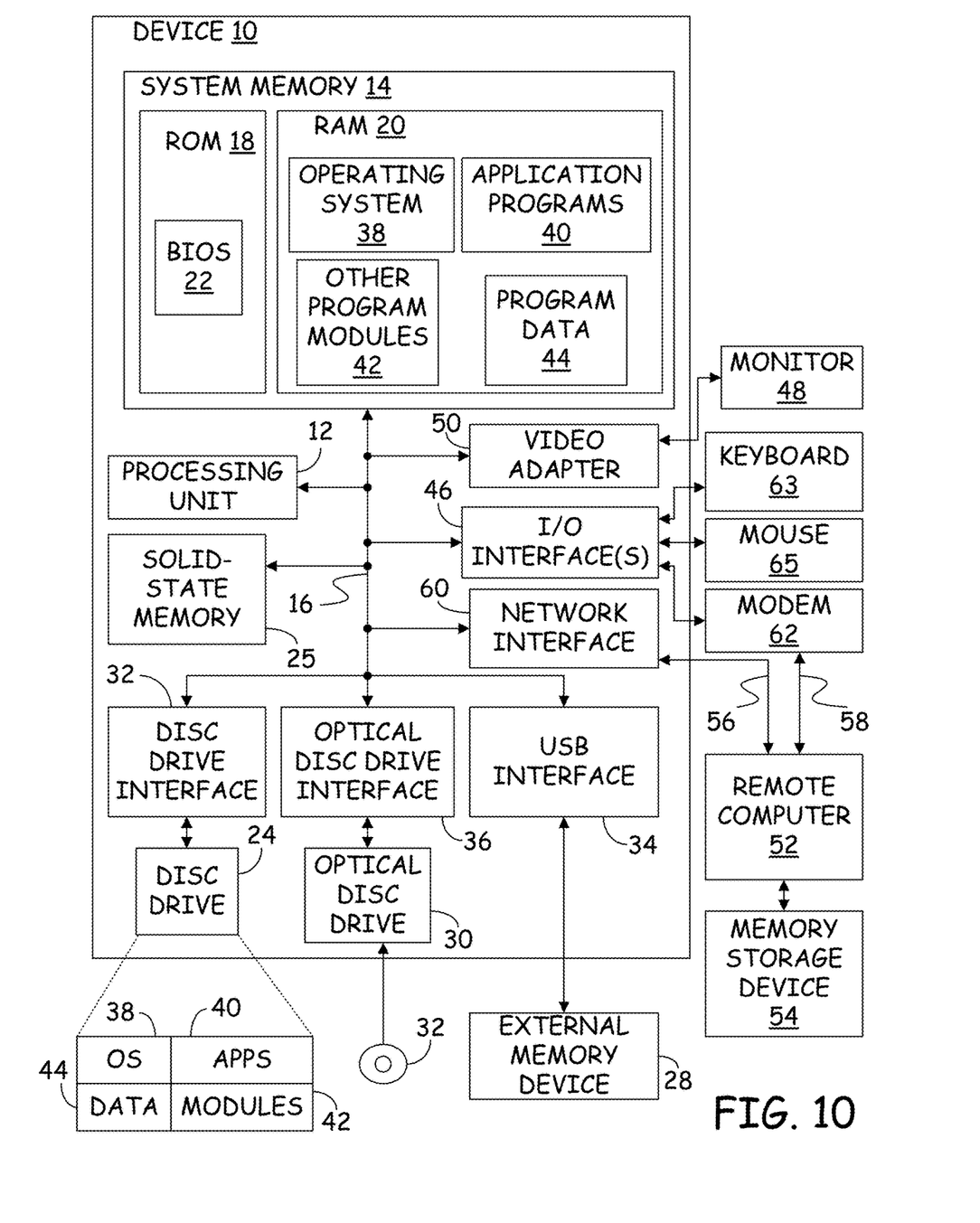
FIG. 10 is a block diagram of a computing device that can be used with the various embodiments.

FIG. 10 provides an example of a computing device 10 that can be used as a server device or client device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing server 204 including programs for implementing prediction engine trainer 206, spectrum prediction engine 202, purchase readiness selection 212, KPI selection 214, emphasis matrix selector 216, page identifier 218, page generator 226 and KPI measurement 232, for example. Program data 44 may include data such as feature collection 208, spectrum confidence values 210, the selected purchase readiness, and type of user interface 224, for example.

Processing unit 12, also referred to as a processor, executes programs in system memory 14 and solid state memory 25 to perform the methods described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 10. The network connections depicted in FIG. 10 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 10 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
    receiving information describing an interaction with a computing system;
    using the information to identify confidence levels for a plurality of purchase readiness states;
    based on the confidence levels for the purchase readiness states, selecting a type of user interface to present to the user by identifying which type of user interface has been assigned a span of purchase readiness states that includes a purchase readiness state with a highest confidence level from the plurality of purchase readiness states;
    selecting emphasis levels for a plurality of elements on the selected type of user interface wherein the emphasis levels are an ordered list of the plurality of elements indicating the relative amount of screen area to be assigned to each element on the user interface and wherein different ordered lists are associated with different purchase readiness states within the span of purchase readiness states associated with the selected type of user interface and wherein selecting the emphasis levels comprises selecting the ordered list associated with the purchase readiness state with the highest confidence level; and
    generating the user interface based on the selected emphasis levels by dynamically setting the screen area for each element based on the position of the element in the ordered list.

2. The method of claim 1 wherein the plurality of purchase readiness states comprise a state of a consumer not knowing what type of product is needed.

3. The method of claim 2 wherein the plurality of purchase readiness states further comprise a state of the consumer being ready to purchase a specific product.

4. The method of claim 1 wherein selecting emphasis levels for a plurality of elements on a user interface comprises selecting the purchase readiness state with the highest confidence level and retrieving a set of emphasis levels associated with the selected purchase readiness state.

5. The method of claim 1 wherein the plurality of elements comprise navigational elements and communication elements and wherein when the selected purchase readiness state indicates that the consumer does not know what type of product is needed, the set of emphasis elements indicate that the communication element is to be emphasized more than the navigational element.

6. The method of claim 1 further comprising receiving feedback indicating how the user interacted with the user interface and based on the feedback altering the confidence level for at least one purchase readiness state.

7. The method of claim 6 further comprising selecting a key performance indicator based on the confidence levels for the purchase readiness states, wherein receiving feedback indicating how the user interacted with the user interface comprises receiving a value for the selected key performance indicator.

8. A computer-implemented method comprising:
receiving information describing an interaction with a computing system;
using the information to identify confidence levels for a plurality of purchase readiness states;
based on the confidence levels for the purchase readiness states, selecting a key performance indicator, a user interface type, and an emphasis matrix that provides an ordered list of user interface elements, wherein different emphasis matrices are assigned to different purchase readiness states within a span of purchase readiness states associated with the user interface type;
dynamically generating a user interface of the selected user interface type such that user interface elements that are lower in the emphasis matrix are displayed on the user interface with less emphasis than user interface elements that are higher in the emphasis matrix;
receiving a value for the key performance indicator based on an interaction with the user interface; and
altering the confidence level for at least one purchase readiness state based on the value of the key performance indicator.

9. The method of claim 8 wherein the key performance indicator comprises a measure of user engagement with the user interface.

10. The method of claim 9 wherein the measure of user engagement with the user interface is selected as the key performance indicator when the purchase readiness state with a highest confidence level is a state of a consumer not knowing what type of product is needed.

11. The method of claim 8 wherein the key performance indicator comprises an indication of whether a purchase was made.

12. The method of claim 9 wherein the indication of whether a purchase was made is selected as the key performance indicator when the purchase readiness state with a highest confidence level is a state of a consumer being ready to purchase a specific product.

13. The method of claim 8 further comprising based on the confidence levels for the purchase readiness state, selecting a type of user interface to use as the user interface.

14. A system comprising:
a memory containing user interface elements;
a processor performing steps comprising:
predicting a confidence level of a plurality of purchase readiness states;
dynamically selecting and organizing user interface elements to construct a user interface based on the predicted confidence levels by selecting a user interface type associated with a purchase readiness state having a highest confidence level and selecting an emphasis matrix associated with the purchase readiness state having a highest confidence level, wherein different emphasis matrices are assigned to different purchase readiness states within a span of purchase readiness states associated with the selected user interface type; and displaying a user interface element that is lower in the emphasis matrix with less emphasis than a user interface element that is higher in the emphasis matrix is displayed with; and
transmitting the user interface to a client device.

15. The system of claim 14 wherein predicting a confidence level of a purchase readiness state comprises weighting features that describe how a consumer is accessing a computer system.

16. The system of claim 14 further comprising identifying a key performance indicator from the confidence level and receiving a value for the key performance indicator based on interaction with the user interface.

17. The system of claim 16 further comprising using the value for the key performance indicator to alter the confidence level of at least one purchase readiness state.

\* \* \* \* \*